Nov. 4, 1924.

J. BREHM 1,514,424

GAUGE FOR TENONING MACHINES

Filed Nov. 25, 1922

Inventor
Joseph Brehm,
By Frank S. Appleman
Attorney

Patented Nov. 4, 1924.

1,514,424

UNITED STATES PATENT OFFICE.

JOSEPH BREHM, OF DELAWARE, OHIO.

GAUGE FOR TENONING MACHINES.

Application filed November 25, 1922. Serial No. 603,308.

*To all whom it may concern:*

Be it known that I, JOSEPH BREHM, a citizen of the United States of America, and resident of Delaware, in the county of Delaware and State of Ohio, have invented certain new and useful Improvements in Gauges for Tenoning Machines, of which the following is a specification.

This invention relates to guides or gauges for tenoning machines, and has for an object the provision of novel means adapted to be attached to any single cut tenoning machine for indicating or guiding the position of the material to be tenoned after a tenon has been cut on one end; that is to say, the invention is intended to be employed for indicating the position which the material shall occupy when a tenon is to be cut on the reverse end of a piece of material which has already been tenoned on one end.

In single tenoning machines now in common use, it has been the practice to operate on the pieces of wood successively, cutting the tenon on one end and thereafter to re-handle the same pieces of material after the machine has been re-set for causing the formation of a tenon on the opposite end.

It is the object of this invention to produce a device which will obviate the necessity of handling the material twice to secure the desired result, and to that end, a gauge is provided in operative relation to the cutters and is capable of being thrown into and out of operative position, in order that when the first tenon is being cut, the gauge will be out of operative position, whereas by a simple expedient, it may be thrown into operative position to act as a gauge for the length of the tenon on the opposite end, and the last mentioned tenon can therefore be produced as a successive step to the formation of the first tenon without the necessity of rehandling the material.

It is a further object of this invention to produce a device of the character indicated which is capable of use in connection with tenoning machines now in common use, and the invention comprises a simple and inexpensive attachment for such machines.

With the foregoing and other objects in view, the invention consists in the details of construction, and in the arrangement and combination of parts to be hereinafter more fully set forth and claimed.

In describing the invention in detail, reference will be had to the accompanying drawings forming part of this application wherein like characters denote corresponding parts in the several views, and in which—

Figures 1, 2, 3, 4:
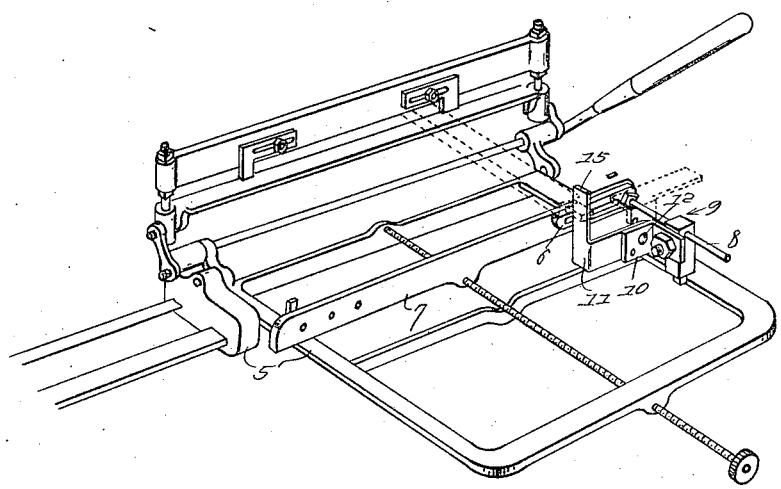
Figure 1 illustrates a view of a fragment of a tenoning machine showing a device embodying the invention applied thereto.
Figure 2 illustrates a perspective view of the gauge and the means associated therewith for attaching it to the machine.
Figure 3 illustrates a perspective view of a member having a tenon on one end.
Figure 4 illustrates a view in perspective having the tenons on two ends.

In these drawings, 5 denotes the frame of an ordinary tenoning machine and parts associated with it, but as the tenoning machine is of conventional design, it is believed unnecessary to describe the parts thereof for an understanding of the invention by one skilled in the art.

The device of this invention comprises a slotted plate 6 which is adapted to be adjustably secured to the T-iron 7 of an ordinary tenoning machine. A rod 8 extends from the plate and a gauge 9 is adjustably secured thereon in order that it will operate in conjunction with material of longer or shorter lengths, according to the requirements in practice. The extension 10 of the gauge has a supplemental gauge that is termed a "cutting-off lock gauge" 11 oscillatably mounted in relation to it by the pivot 12, in order that the lock gauge may be moved to the operative position shown in Fig. 1, or to the inoperative position illustrated by dotted lines. The lock gauge has a slot 13 which receives a stud 14 to limit the movement of the lock gauge when it has assumed its operative position, and in the operation of the tenoning device or machine, this lock gauge will be caused to assume the dotted-line position illustrated in Fig. 1 when the material is being tenoned on one end and the other end is plain. When the material is reversed to cut the tenon on the opposite end, the lock gauge will be swung to the full line position, and the blade 15 of the gauge will have its edge engaging the shoulder of the material being worked and the edge of the tenon first formed. When the parts have been adjusted to the position just stated, the machine and work is ready to be operated to cut the tenon on the other end of the material.

From an inspection of the drawing and the foregoing description, it is obvious that an operator may present an end of the material to the knives that form the tenon when the gauge is in the dotted line position and by simple movement of the gauge, it can be swung into operative position to act in conjunction with the tenon first formed, in order that the material may be properly positioned to at once receive treatment for forming the other tenon.

The device is inexpensive and can be expeditiously installed on machines now in common use so that the machine can be provided with a device having these functions, and their installation will prove economical and result in effective operation.

My improvement is particularly adapted to that class of gauges for tenoning machines used in making tenons upon bars of wood which are either curved or straight. A type of machine upon which my invention is applicable is the well known McKnight back tenoning machine manufactured by the L. G. McKnight & Son Co. of Gardner, Massachusetts, although my invention is applicable to other types of back tenoning machines.

In practice, the open frame may be considered as a table which at times as, for instance, producing curved work, will form no obstruction to the piece of wood. A pair of cutters will be located to form a straight tenon on the work when the table is horizontal, but when slightly raised, it is used to form a tenon on material that is not straight, as the back of a chair, which tenon may be centered on the curve or project at right angles from the base of the tenon.

I claim:

1. In a gauge for tenoning machines, an open table frame, means for attaching said frame to a tenoning machine, a cross bar maintained at right angles to the plane of the table and provided with means for moving the same in adjusted positions to and from the ends of the table, a gauge member adjustable laterally upon the cross bar and provided with a pivoted gauge member which is adapted to be moved on its pivot to occupy a position above the cross bar and also below the upper edge of the same.

2. A gauge for tenoning machines, for use in tenoning both ends of a piece of work, consisting of a frame, a cross bar adjustable on said frame and projecting upward at right angles therefrom, a rod revolubly attached to the frame and threaded into the cross bar, a gauge comprising a slotted member, a rod attached to said slotted member, and a stop member adjustably mounted on the rod and adapted to be swung into vertical position to abut against a shoulder of a previously formed tenon and into a horizontal position to be out of line with the upper edge of the cross bar.

3. In a gauge for back tenoning machines, a structure adapted to be attached to such a machine and provided with a tiltable frame having a cross bar and means for positioning said cross bar upon the frame, a stop member which is adjustably connected to the cross bar above the plane of the frame, a rod extending rearwardly from the cross bar, said rod maintaining a slidable support for a gauge, an angle iron, a gauge plate pivotally attached to the angle iron, said gauge plate cooperating with the cross bar and the pivoted gauge plate.

4. A gauge for tenoning machines comprising a frame and means for movably associating said frame with a tenoning machine, a cross bar adjustably attached to the frame, a rod which extends from the cross bar below the plane of its upper edge, a block adjustably mounted on the rod, an angular member connected to the block, and a blade having an angular extension which is pivotally connected to the angular member.

JOSEPH BREHM.